(12) United States Patent
Pourazima et al.

(10) Patent No.: US 11,653,170 B2
(45) Date of Patent: May 16, 2023

(54) IN-EAR SPEAKER

(71) Applicant: Meta Platforms Technologies, LLC, Menlo Park, CA (US)

(72) Inventors: Nicholas Pourazima, Alexandria, VA (US); Israel Dejene Gebru, Pittsburgh, PA (US); Dejan Markovic, Pittsburgh, PA (US); James White, Pittsburgh, PA (US); Steven Krenn, Pittsburgh, PA (US); Matthew Stewart, Pittsburgh, PA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 404 days.

(21) Appl. No.: 16/994,098

(22) Filed: Aug. 14, 2020

(65) Prior Publication Data

US 2021/0297763 A1  Sep. 23, 2021

Related U.S. Application Data

(60) Provisional application No. 62/991,491, filed on Mar. 18, 2020.

(51) Int. Cl.
*H04R 1/00* (2006.01)
*H04S 7/00* (2006.01)
(Continued)

(52) U.S. Cl.
CPC ............. *H04S 7/304* (2013.01); *G06V 40/10* (2022.01); *H04R 1/1016* (2013.01); *H04R 5/027* (2013.01);
(Continued)

(58) Field of Classification Search
CPC .. H04S 7/304; H04S 2400/15; H04S 2420/01; H04S 7/301; G06V 40/10;
(Continued)

(56) References Cited

U.S. PATENT DOCUMENTS

2010/0266150 A1  10/2010  Wax
2012/0170779 A1*  7/2012  Hildebrandt ......... H04R 5/0335
                                                                  381/310
(Continued)

FOREIGN PATENT DOCUMENTS

EP        3657816 A1 *  5/2020  .......... H04R 1/1016
WO     2019017036 A1    1/2019

OTHER PUBLICATIONS

Hrauda W., "Essentials on HRTF Measurement and Storage Format Standardization," Bachelor Thesis [online], XP055336668, Jun. 14, 2013, 55 pages, Retrieved from the Internet: URL: http://iem.kug.ac.at/fileadmin/media/iem/projects/2013/hrauda.pdf.
(Continued)

*Primary Examiner* — Matthew A Eason
(74) *Attorney, Agent, or Firm* — Baker Botts L.L.P.

(57) ABSTRACT

In one embodiment, a method for emitting a sound from an in-ear speaker worn by a subject includes generating, by an audio source of the in-ear speaker, a source audio signal. One or more speakers of the in-ear speaker may emit a sound based on the audio signal and an audio-transport tube of the in-ear speaker may receive the sound. The one or more speakers may be comprised of a singular speaker or a speaker array coupled to a crossover network. The audio-transport tube has an input end coupled to the one or more speakers to receive the sound. An audio reflector of the in-ear speaker may reflect the sound. The audio reflector is coupled to an output end of the audio-transport tube.

18 Claims, 8 Drawing Sheets

(51) Int. Cl.
     *H04R 5/027*    (2006.01)
     *H04R 5/04*     (2006.01)
     *H04R 1/10*     (2006.01)
     *H04R 5/033*    (2006.01)
     *G06V 40/10*    (2022.01)

(52) U.S. Cl.
     CPC .............. *H04R 5/033* (2013.01); *H04R 5/04* (2013.01); *H04S 2400/15* (2013.01); *H04S 2420/01* (2013.01)

(58) Field of Classification Search
     CPC ...... H04R 1/1016; H04R 5/027; H04R 5/033; H04R 5/04; H04R 1/345; H04R 1/1008; H04R 2201/023
     See application file for complete search history.

(56) References Cited

U.S. PATENT DOCUMENTS

| | | | |
|---|---|---|---|
| 2017/0195793 A1* | 7/2017 | Vilermo | .............. H04S 7/304 |
| 2017/0245081 A1 | 8/2017 | Lyren et al. | |
| 2017/0332186 A1 | 11/2017 | Riggs et al. | |
| 2018/0220253 A1 | 8/2018 | Karkkainen et al. | |
| 2019/0261116 A1 | 8/2019 | Norris et al. | |
| 2020/0137476 A1 | 4/2020 | Shinmen et al. | |

OTHER PUBLICATIONS

International Search Report and Written Opinion for International Application No. PCT/IB2021/053661, dated Sep. 15, 2021, 13 Pages.

International Search Report and Written Opinion for International Application No. PCT/US2021/019491, dated May 25, 2021, 13 Pages.

Matsunaga, et al., Reexamination of fast head-related transfer function measurement by reciprocal method, the Acoustical science and technology, 31, 6 (2010):414-416, Jul. 1, 2010.

Borra, et al., 1st-Order Microphone Array System for Large Area Sound Field Recording and Reconstruction: Discussion and Preliminary Results, 2019 IEEE Workshop on Applications of Signal Processing to Audio and Acoustics, New Paltz, NY, 5 pages, Oct. 2019.

Johansson, VR for Your Ears: Dynamic 3D Audio Is Coming Soon, IEEE Spectrum, 8 pages. Available at: https://spectrum.ieee.org/consumer-electronics/audiovideo/vr-for-your-ears-dynamic-3d-audio-is-coming-soon, Jan. 24, 2019.

Audio Research—RHRTF Deep Dive, Direct HRTF Measurement Setup, 25 pages.

Zotkin, et al., Fast Head-Related Transfer Function Measurement Via Reciprocity, The Journal of the Acoustical Society of America, 120(4):2202-2215, Oct. 2006.

* cited by examiner

IN-EAR SPEAKER

PRIORITY

This application claims the benefit under 35 U.S.C. § 119(e) of U.S. Provisional Patent Application No. 62/991,491, filed 18 Mar. 2020, which are incorporated herein by reference.

TECHNICAL FIELD

This disclosure generally relates to an in-ear speaker used for determining a dynamic head-related transfer function for a subject.

BACKGROUND

A head-related transfer function (HRTF) may be used to characterize how an ear of a subject receives sound from a point in space. Specifically, an HRTF for a subject may be used to synthesize a binaural sound that appears to the subject to originate from a given point in three-dimensional (3D) space. Conventionally, an HRTF may be measured for a subject by placing a microphone inside the ear of the subject to receive sounds emitted from a series of speakers within an anechoic chamber. Each of the series of speakers may be disposed in a circular, or semi-circular, arrangement proximate to the microphone inside the ear of the subject to emit a respective sound such that the microphone may capture the sound emitted from each speaker individually. However, this process may be time-consuming as the HRTF requires measurements in small increments (e.g., one measurement for each 5° to 30° in a horizontal plane) such that each speaker in the series may emit a respective sound for each increment. In addition, this process may prove arduous for the subject as each HRTF measurement requires the subject to remain still while the microphone inside the ear of the subject receives the respective sound emitted from each speaker of the series of speakers individually. Furthermore, this process may not account for changes in position of the subject (e.g., tilting head, rotating head, and the like) as the subject is required to remain still throughout the process, thus limiting the scope of binaural sounds that the HRTF measurements may synthesize for the subject.

SUMMARY OF PARTICULAR EMBODIMENTS

In particular embodiments, a dynamic head-related transfer function (HRTF) for a subject may be determined using an in-ear speaker, a series of audio sensors, and a series of image sensors. The in-ear speaker may be worn inside the ear of a subject within a soundproof chamber, or "capture space," such that the in-ear speaker may emit a sound outwardly away from the ear of the subject into the surrounding capture space. In one embodiment, the sound emitted from the in-ear speaker may be or include a sine wave sweep, increasing or decreasing in frequency such that a range of multiple frequencies (e.g., from 20 Hz to 20 kHz) may be emitted throughout the capture space. To emit the sound, an audio source of the in-ear speaker may first generate a source audio signal. A crossover network coupled to the audio source may filter the source audio signal into multiple frequency signals. One or more speakers coupled to the crossover network may respectively emit the sound and an audio-transport tube having an input end coupled to the speakers may receive the sound. An audio reflector coupled to an output end of the audio-transport tube may receive the sound and reflect the sound throughout the capture space.

Innovative aspects of the subject matter described in this specification may be embodied in a system and method for generating, by an audio source of the in-ear speaker, a source audio signal; emitting, by one or more speakers of the in-ear speaker, the sound based on the source audio signal; receiving, by an audio-transport tube of the in-ear speaker, the sound, the audio-transport tube having an input end coupled to the one or more speakers to receive the sound; reflecting, by an audio reflector of the in-ear speaker, the sound, the audio reflector coupled to an output end of the audio-transport tube.

In one or more of the disclosed embodiments, the method further includes capturing, by a microphone of the in-ear speaker, the sound, the microphone coupled to the audio reflector.

In one or more of the disclosed embodiments, the microphone is enclosed within the audio reflector.

In one or more of the disclosed embodiments, the audio reflector is configured to be worn inside an ear of the subject.

In one or more of the disclosed embodiments, the audio reflector includes an open end and a closed end, the open end directed away from the ear of the subject, the closed end comprised of a rigid surface worn inside the ear of the subject and configured to reflect the sound away from the ear of the subject through the open end.

In one or more of the disclosed embodiments, the method further includes preventing, by an absorptive material removably coupled to the audio reflector, an inner-ear of the subject from receiving the sound, the absorptive material configured to be worn inside the inner-ear of the subject.

In one or more of the disclosed embodiments, the method further includes converting, by an audio converter coupled to the audio source, a digital source audio signal into the source audio signal.

In one or more of the disclosed embodiments, each of the one or more speakers is disposed within a speaker funnel inside the enclosure.

In one or more of the disclosed embodiments, the one or more speakers comprise a singular speaker.

In one or more of the disclosed embodiments, the one or more speakers comprise a speaker array coupled to a crossover network, the crossover network coupled to the audio source and configured to filter the source audio signal from the audio source into a plurality of frequency signals, the speaker array comprised of a plurality of speakers configured to respectively emit a frequency signal of the plurality of frequency signals.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

DESCRIPTION OF EXAMPLE EMBODIMENTS

Figure 1:
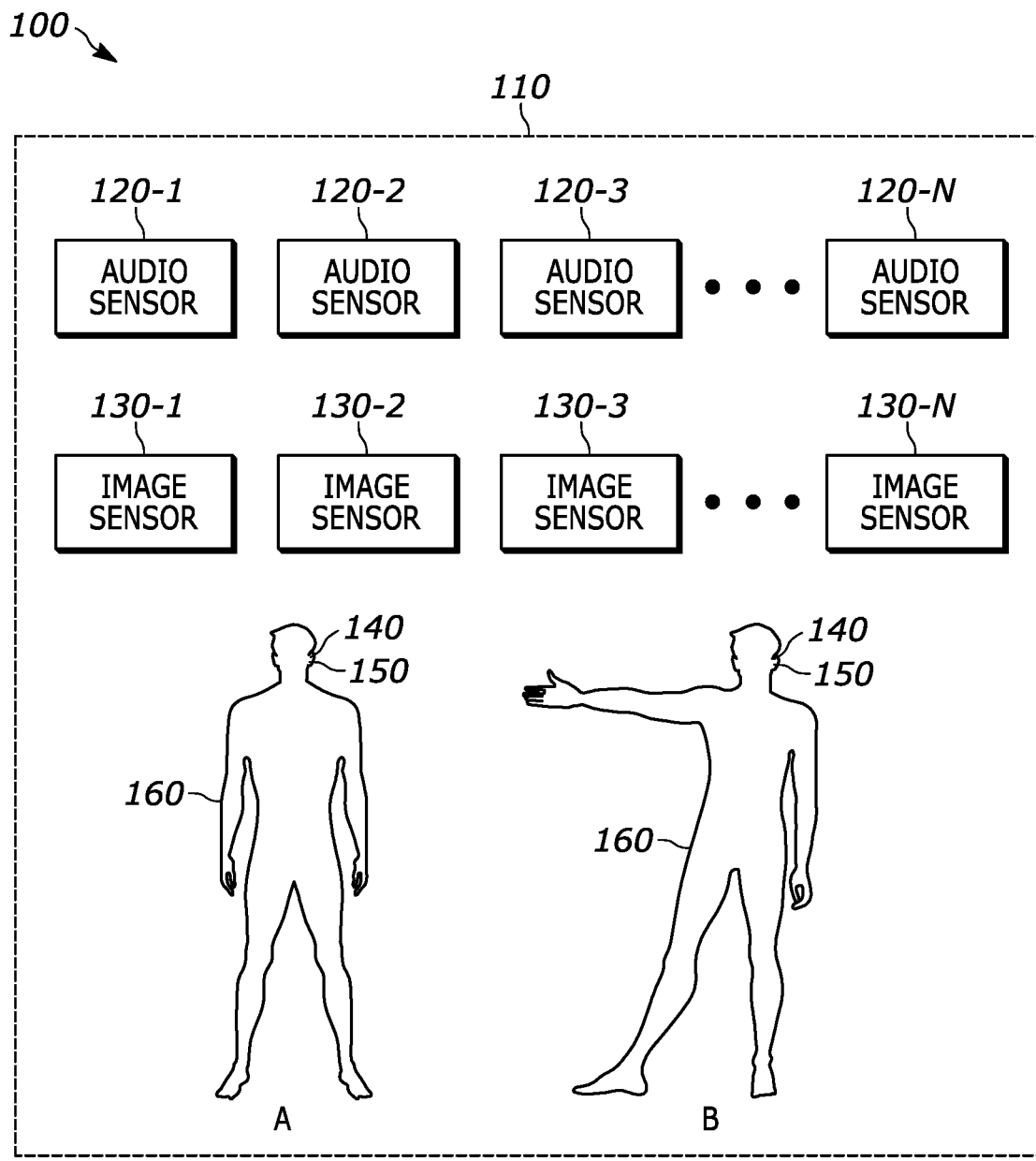
FIG. 1 illustrates selected elements of an example system environment for determining a dynamic reverse head-related transfer function for a subject.

FIG. 1 illustrates selected elements of an example system environment for determining a dynamic reverse head-related transfer function for a subject. In the example illustrated in FIG. 1, system environment 100 includes capture space 110 and computing device 170. Capture space 110 includes a series of audio sensors 120-1 through 120-N (collectively referred to herein as "audio sensors 120"), a series of image sensors 130-1 through 130-N (collectively referred to herein as "image sensors 130"), and a subject 160 wearing an in-ear speaker 140 in the right ear of subject 160 shown in FIG. 1. In-ear speaker 140 is coupled to a microphone 150 that is also worn in the right ear of subject 160 shown in FIG. 1. Computing device 170 includes a head-related transfer function (HRTF) database 180 for storing measured dynamic HRTF for the subject 160. In other embodiments, system environment 100 may include additional, fewer, and/or any combination of components suitable for determining a dynamic HRTF for a subject.

In one embodiment, capture space 110 may comprise a room, or other enclosed space, generally operable to absorb reflections of sound. In particular, capture space 110 may absorb reverberant sound waves such that sensor devices within capture space 110 may exclusively detect direct sound waves. These "free-field" conditions may be used to measure a transfer function associated with a sound source. For example, in-ear speaker 140 may emit an acoustic pressure wave within capture space 110 such that a series of audio sensors 120 disposed throughout capture space 110 may capture the sound. The captured sound or waveform may be used, in part, to compute a dynamic HRTF for a subject. In the embodiment illustrated in FIG. 1, capture space 110 may include a series of audio sensors 120 and a series of image sensors 130. For example, capture space 110 may include microphones and cameras disposed evenly throughout capture space 110 to detect a sound generated by in-ear speaker 140 and capture images of subject 160, respectively. In one embodiment, capture space 110 may be or include a dome having audio sensors 120 and image sensors 130 disposed evenly throughout the dome surrounding subject 160. In another embodiment, capture space 110 may be or include an audio/visual capture stage which includes audio sensors 120 and image sensors 130 embedded in the walls and directed toward subject 160. In other embodiments, capture space 110 may be or include an anechoic chamber, a semi-anechoic chamber, and/or any combination of soundproof environments suitable for absorbing reflections of sound.

In one embodiment, in-ear speaker 140 may comprise a system, device, or apparatus generally operable to emit a sound (e.g., an acoustic pressure wave) outwardly away from the head of a subject. Specifically, in-ear speaker 140 may be worn inside an ear (e.g., left ear, right ear, or both ears) of subject 160 such that in-ear speaker 140 may emit a sound outwardly away from the ear of subject 160 into the surrounding capture space 110. In one embodiment, each sound emitted by in-ear speaker 140 may be or include a "sine wave sweep," increasing in frequency (e.g., ranging from 20 Hz to 20 kHz) such that the various frequencies are emitted into the surrounding capture space 110. For example, in-ear speaker 140 may include a crossover network (not shown in figure) configured to partition a source audio signal into high, middle, and low-frequency sound waves through respective transducers. These high, middle, and low-frequency sound waves may be emitted by the in-ear speaker 140 throughout capture space 110 such that audio sensors 120 may capture the sound waves for processing. In other embodiments, sounds emitted by in-ear speaker 140 may be or include a log sweep, linear sweep, white noise, pink noise, and/or any combination of sounds suitable for serving as a reference signal. In-ear speaker 140 is described in further detail with respect to FIGS. 2-6.

In one embodiment, microphone 150 may comprise a system, device, or apparatus generally operable to capture the sound emitted by in-ear speaker 140. In particular, microphone 150 may be coupled to in-ear speaker 140 inside an ear of subject 160 such that microphone 150 may capture a sound adjacent to the ear canal of subject 160 before the sound reflects and exits the ear to be modified by anthropometric features of subject 160. For example, various frequencies of an input signal may become boosted or attenuated as the sound leaves the in-ear speaker 140 and reflects off the head, ears, and body of subject 160. Because the sounds are captured prior to becoming modified, sound captured by microphone 150 may serve as a "reference signal" in determining a dynamic HRTF for subject 160. That is, computing device 170 may use reference signals captured by microphone 150 as input signals during processing to determine a dynamic HRTF for subject 160. In one embodiment, microphone 150 may be or include a microelectromechanical system (MEMS) microphone. In other embodiments, microphone 150 may be or include a dynamic microphone, a condenser microphone, a piezoelectric microphone, or any combination of transducers suitable for receiving and converting sound waves into electrical signals.

In one embodiment, each audio sensor 120-1 through 120-N may comprise a system, device, or apparatus generally operable to capture sound emitted by in-ear speaker 140. Specifically, audio sensors 120 may be disposed throughout capture space 110 (e.g., embedded in the walls) such that a diaphragm, or other acoustic sensor, of each audio sensor 120 is directed toward subject 160 (and in-ear speaker 140). Each audio sensor 120 may capture sounds emitted by in-ear speaker 140 after the sounds have exited the ear and have become modified by the anthropometric features of subject 160. For example, various frequencies of a sound may become modified in response to reflecting off the pinna of the ear and other parts of the body of subject 160 while exiting the ear. Because sounds are captured after becoming modified, sounds captured by each audio sensor 120 may serve as output signals in determining a dynamic HRTF for subject 160. That is, computing device 170 may use audio recordings of sounds captured by each audio sensor 120 as output signals during processing to determine a dynamic HRTF for subject 160. In one embodiment, audio sensors 120 may be or include a series of omnidirectional microphones. In other embodiments, audio sensors 120 may be or include a series of dynamic microphones, condenser microphones, piezoelectric microphones, ambisonic microphones, higher-order-ambisonic microphones, or any combination of transducers suitable for receiving and converting sound waves into electrical signals.

In one embodiment, each image sensor 130-1 through 130-N may comprise a system, device, or apparatus generally operable to capture one or more images of subject 160. In particular, image sensors 130 may be disposed throughout capture space 110 (e.g., embedded in the walls) such that a lens, or other light sensor, of each image sensor 130 is directed toward subject 160. Each image sensor 130 may capture one or more images (e.g., still images, video images, and the like) depicting the body pose of subject 160, or the orientation of subject 160 in relation to capture space 110. In one embodiment, image sensors 130 may capture one or more images of subject 160 while in-ear speaker 140 is emitting a sound such that a body pose of subject 160 may be mapped to both the audio recordings of the sound captured by audio sensors 120 and the reference signal captured by microphone 150. In one embodiment, image sensors 130 may be or include a series of digital cameras. In another embodiment, image sensors 130 may be or include a series of depth sensors, range imaging cameras, time-of-flight (ToF) cameras, and the like. In other embodiments, image sensors 130 may be or include a series of thermographic cameras, infrared cameras, and/or any combination of image sensors suitable for receiving and converting images into electrical signals.

In one embodiment, computing device 170 may comprise a system, device, or apparatus generally operable to determine a dynamic HRTF for subject 160. Computing device 170 may receive audio recordings captured by audio sensors 120 of a sound, or sounds, emitted by in-ear speaker 140. In addition, computing device 170 may receive a reference signal, or reference signals, captured by microphone 150 and one or more images captured by image sensors 130. The one or more images may depict a body pose of subject 160 in relation to the surrounding capture space 110 while in-ear speaker 140 is emitting the sound. By allowing subject 160 to change body pose, a dense set of measurements may be achieved and used to determine a dynamic HRTF for subject 160. In one embodiment, computing device 170 may be or include a desktop computer. In other embodiments, computing device 170 may be or include a server system, microcontroller unit, tablet computer, notebook computer, and/or any combination of computing devices suitable for determining a dynamic HRTF for a subject.

In one embodiment, computing device 170 may use the one or more images captured by image sensors 130 to generate a model, or a "pose representation," of the body pose of subject 160 to be used for determining a dynamic HRTF. Conventional HRTF measurements may not account for changes in position of the subject (e.g., tilting head, rotating head, and the like) as the subject is required to remain still throughout the process, thus limiting the scope of binaural sounds that the HRTF measurements may synthesize for the subject. For example, a conventional HRTF dataset may be represented using the functions $HRTF\_L(azimuth\_i, elevation\_i)$ and $HRTF\_R(azimuth\_i, elevation\_i)$ for left (L) and right (R) ears of a subject, respectively. In this example, "i" may serve as an index used to represent each speaker in a series of speakers where azimuth_i and elevation_i describe angles that indicate a position of each speaker in relation to a subject. In contrast, computing device 170 may use a pose representation of a body pose of subject 160 to yield a dense set of measurements that accounts for changes in position of subject 160. For example, a dynamic HRTF dataset may be represented using the functions: $HRTF\_L(azimuth\_i, elevation\_i, radius\_i, pose\_j)$ and $HRTF\_R(azimuth\_i, elevation\_i, radius\_i, pose\_j)$ for left (L) and right (R) ears of subject 160, respectively. In this example, "i" may serve as an index used to represent each audio sensor 120 in capture space 110 where azimuth_i and elevation_i describe angles that indicate a position of each audio sensor 120 in relation to subject 160. Additionally, radius_i may describe a distance between subject 160 and each audio sensor 120 and pose_j may describe body pose of subject 160 (i.e., as indicated using a pose representation). Here, "j" may serve as an additional index used to represent each body pose of subject 160 for multiple body poses that correspond to a specific azimuth_i, elevation_i, and radius_i of a given audio sensor 120. By allowing subject 160 to change body pose, dynamic HRTF measurements effectively increase the scope of binaural sounds that HRTF measurements may synthesize for a subject. In one embodiment, the pose representation of the body pose may be or include a three-dimensional (3D) virtual reconstruction of the body pose of subject 160. For example, a pose representation may be generated using a 3D mesh from which an azimuth, elevation, radius, and body pose of subject 160 in relation to each audio sensor 120 may be derived.

In one embodiment, computing device 170 may process the audio recordings of the sounds captured by audio sensors 120 with the reference signal captured by microphone 150 and the pose representation to determine an HRTF for each audio sensor 120-1 through 120-N within capture space 110. That is, computing device 170 may determine an HRTF for the position of each audio sensor 120 within capture space 110 for a given body pose of subject 160. In the example illustrated in FIG. 1, computing device 170 may first determine an HRTF for the position of each audio sensor 120 within capture space 110 for body pose "A" of subject 160. In one embodiment, computing device 170 may process the audio recordings of the sounds captured by audio sensors 120 with the pose representation and reference signal captured by microphone 150 (e.g., using deconvolution) where the audio recordings may serve as an output signal and the reference signal may serve as an input signal. For example, computing device 170 may determine an HRTF ($H_1(\omega)$) for audio sensor 120-1 (shown in FIG. 1) using the equation below:

$$H_1(\omega) = \frac{Y_1(\omega)}{X(\omega)}$$

In the equation above, $Y_1(\omega)$ is the output signal (i.e., audio recording captured by audio sensor 120-1) and $X(\omega)$ is the input signal (i.e., reference signal captured by microphone 150). Because both input and output signals are known, computing device 170 may solve for $H_1(\omega)$, thereby determining an HRTF for the position of audio sensor 120-1 in capture space 110. In one embodiment, computing device 170 may store HRTF ($H_1(\omega)$) in HRTF database 180 with data indicating a pose representation associated with the HRTF (e.g., indicating body pose "A" of subject 160).

In another example, computing device 170 may determine an HRTF ($H_2(\omega)$) for audio sensor 120-2 (shown in FIG. 1) using the equation below:

$$H_2(\omega) = \frac{Y_2(\omega)}{X(\omega)}$$

In the equation above, $Y_2(\omega)$ is the output signal (i.e., audio recording captured by audio sensor 120-2) and $X(\omega)$ is the input signal (i.e., reference signal captured by microphone 150). Again, because both input and output signals are known, computing device 170 may solve for $H_2(\omega)$, thereby determining an HRTF for the position of microphone 120-2 in capture space 110. In one embodiment, computing device 170 may store HRTF ($H_2(\omega)$) in HRTF database 180 with data indicating the pose representation associated with the HRTF. For example, computing device 170 may store the HRTF for each audio sensor 120 as a data structure that includes: an HRTF measurement; azimuth, elevation, and radius values of the audio sensor 120 in relation to subject 160; and pose representation coordinates indicating a body pose "A" of subject 160. In one embodiment, computing device 170 may determine an HRTF for each audio sensor 120-1 through 120-N within capture space 110. That is, computing device 170 may determine an HRTF for the position of each audio sensor 120 within capture space 110 for a given pose representation.

In one embodiment, computing device 170 may process audio recordings of additional sounds captured by audio sensors 120 with an additional reference signal captured by microphone 150 embedded within in-ear speaker 140 and the pose representation to determine an HRTF for each audio sensor 120-1 through 120-N within capture space 110. That is, computing device 170 may determine an HRTF for the position of each audio sensor 120 within capture space 110 for an additional body pose of subject 160. In the example illustrated in FIG. 1, computing device 170 may determine an HRTF for the position of each audio sensor 120 within capture space 110 for additional body pose "B" of subject 160. In response to subject 160 changing body pose, in-ear speaker 140 may emit an additional sound from an ear (e.g., left ear, right ear, or both ears) of subject 160 while subject 160 is oriented in the additional body pose. Microphone 150 may capture an additional reference signal before the additional sound exits the ear and becomes modified by anthropometric features of subject 160. Similarly, audio sensors 120 may capture the additional sound after the additional sound exits the ear and becomes modified by the anthropometric features of subject 160. In addition, image sensors 130 may capture an additional one or more images of subject 160 while in-ear speaker 140 is emitting the additional sound. The additional body pose of subject 160 may be mapped to both the audio recordings of the additional sound captured by audio sensors 120 and the additional reference signal captured by microphone 150.

In one embodiment, computing device 170 may modify the pose representation of the body pose of subject 160 based on the additional one or more images captured by image sensors 130. In particular, computing device 170 may modify the pose representation to represent the additional body pose of subject 160 as shown in the additional one or more images. In the example shown in FIG. 1, computing device 170 may modify the pose representation to represent additional body pose "B" of subject 160. Computing device 170 may process audio recordings of the additional sound captured by audio sensors 120 with the additional reference signal captured by microphone 150 and the pose representation to determine an HRTF for each audio sensor 120 as described above with respect to body pose "A." In one embodiment, computing device 170 may store the HRTF for each audio sensor 120 in HRTF database 180 with data indicating the pose representation associated with the HRTF. For example, computing device 170 may store the HRTF for each audio sensor 120 as a data structure that includes: an HRTF measurement; azimuth, elevation, and radius values of the audio sensor 120 in relation to subject 160; and pose representation coordinates indicating additional body pose "B" of subject 160.

In one embodiment, HRTF database 180 may comprise a system, device, or apparatus generally operable to store HRTF measurements for each audio sensor 120 in capture space 110. In particular, HRTF database 180 may store HRTF measurements and associated metadata for the position of each audio sensor 120 within capture space 110. For example, each entry stored in HRTF database 180 may correspond to an audio sensor 120, or position of the audio sensor 120 within capture space 110, and include: an HRTF measurement; azimuth, elevation, and radius values of the audio sensor 120 in relation to subject 160; and pose representation coordinates indicating a given body pose of subject 160. Here, each audio sensor 120 within capture space 110 may include multiple entries in HRTF database 180. Specifically, each audio sensor 120 may include multiple HRTF measurements in HRTF database 180 that each correspond to a respective body pose of subject 160. Because HRTF database 180 includes multiple HRTF measurements that correspond to each respective body pose of subject 160, computing device 170 may access HRTF database 180 to determine an HRTF measurement for a given position within capture space 110 that corresponds to a given body pose of subject 160, thereby determining a dynamic HRTF for subject 160.

Figure 2:
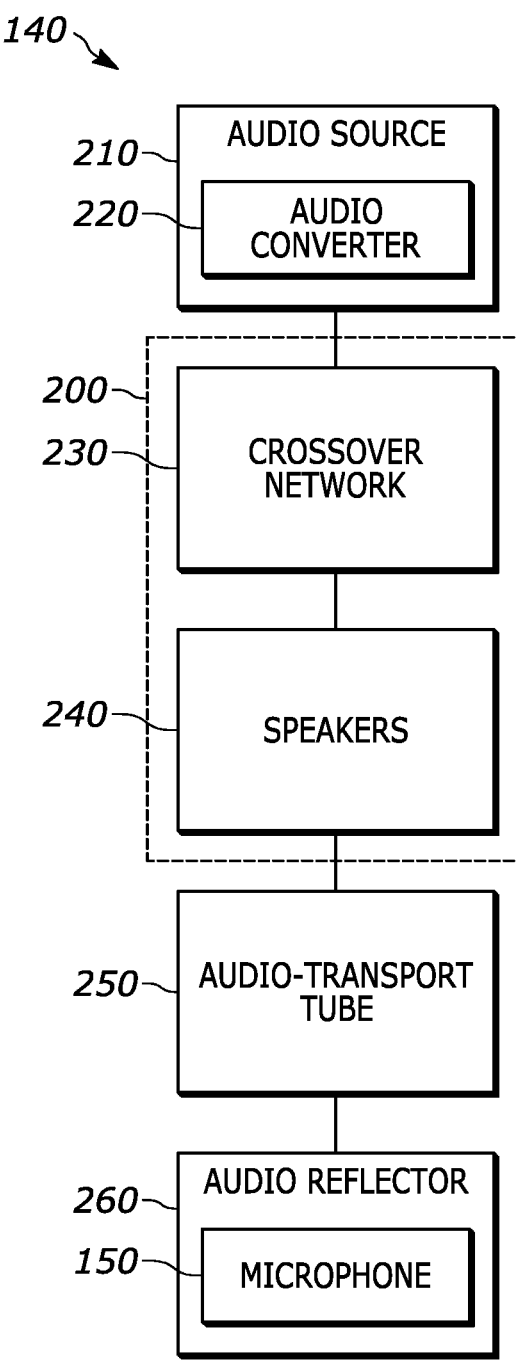
FIG. 2 illustrates selected elements of an example in-ear speaker.

FIG. 2 illustrates selected elements of an example in-ear speaker. As described above with respect to FIG. 1, in-ear speaker 140 may comprise a system, device, or apparatus generally operable to emit a sound outwardly away from the head of subject 160. In particular, in-ear speaker 140 may be worn inside the ear of subject 160 such that in-ear speaker 140 emits sounds outwardly away from the ear of subject 160 into the surrounding capture space 110. In the embodiment illustrated in FIG. 2, in-ear speaker 140 includes an audio source 210, a crossover network 230, one or more speakers 240, an audio-transport tube 250, and an audio reflector 260. Audio source 210 includes an audio converter 220. Audio reflector 260 includes a microphone 150. In other embodiments, in-ear speaker 140 may include additional, fewer, and/or any combination of components suitable for emitting a sound outwardly away from the head of subject 160.

In one embodiment, audio source 210 may comprise a system, device, or apparatus generally operable to generate a digital signal, or a "source audio signal," to be converted into an analog signal and used as a sound. For example, audio source 210 may generate a digital sine wave to be converted into an analog signal and used as a sine wave sweep emitted from in-ear speaker 140 as a sound. In the embodiment illustrated in FIG. 2, audio source 210 includes an audio converter 220 to convert the digital source audio signal into an analog source audio signal to be sent to crossover network 230. In one embodiment, audio source 210 may be or include a computing device. In other embodiments, audio source 210 may be or include a sine oscillator circuit, microcontroller unit, and/or any combination of audio sources suitable for generating a digital source audio signal.

In one embodiment, audio converter 220 may comprise a system, device, or apparatus generally operable to convert a digital signal generated by audio source 210 into an analog source audio signal. Specifically, audio converter 220 may be coupled to audio source 210 to receive a digital source audio signal and convert the digital source audio signal into an analog source audio signal. For example, audio converter 220 may convert a finite precision number such as a fixed-point binary number comprising the digital source audio signal into a physical quantity such as a sound pressure comprising the analog source audio signal. That is, audio converter 220 may receive digital output from audio source 210 and convert the digital output into analog line-level output capable of being filtered by crossover network 230 and emitted by speakers 240. In one embodiment, audio converter 220 may be or include a sound card coupled to audio source 210. In other embodiments, audio converter 220 may be or include a digital-to-analog converter (DAC), a network of weighted resistors, and/or any combination of electronic components suitable for converting a digital signal into an analog source audio signal.

In one embodiment, crossover network 230 may comprise a system, device, or apparatus generally operable to filter a source audio signal into respective frequency signals. In particular, crossover network 230 may receive the analog source audio signal from audio converter 220 (e.g., via a 3.5 mm headphone jack) and split the source audio signal into two or more respective frequencies such that each respective frequency may be emitted by speakers 240. For example, crossover network 230 may receive a source audio signal from audio converter 220 and filter the received source audio signal into a high-frequency, a middle-frequency, and a low-frequency signal using a combination of high-pass, band-pass, and low-pass filters, respectively. In the embodiment illustrated in FIG. 2, crossover network 230 may be coupled to speakers 240 such that crossover network 230 may provide the respective high-frequency, middle-frequency, and low-frequency signals to speakers 240. In one embodiment, crossover network 230 may be or include an active crossover network, a passive crossover network, a digital crossover network, a mechanical crossover network, and/or any combination of crossover networks suitable for filtering a source audio signal into respective frequency signals. In the embodiment illustrated in FIG. 2, crossover network 230 may be enclosed within enclosure 200 of in-ear speaker 140. In another embodiment, crossover network 230 may be located outside of enclosure 200. In other embodiments, in-ear speaker 140 may not include crossover network 230 as illustrated in FIG. 2.

In one embodiment, speakers 240 may comprise a system, device, or apparatus generally operable to emit a sound comprised of multiple frequency signals. Specifically, speakers 240 may be comprised of one or more speakers having various specifications (e.g., size, frequency response, impedance, sensitivity, and the like) such that each speaker in speakers 240 may be optimized to emit a respective frequency. In the embodiment illustrated in FIG. 2, each speaker of speakers 240 may receive a frequency signal from crossover network 230 in accordance with the frequency in which the speaker is optimized to emit. For example, a speaker configured to optimize high-frequencies may receive a high-frequency signal from crossover network 230. Similarly, a speaker configured to optimize middle-frequencies may receive a middle-frequency signal from crossover network 230. Speakers 240 may be enclosed within enclosure 200 to dampen leakage such that sounds emitted from speakers 240 are prevented from diffusing throughout the surrounding capture space 110. Specifically, the sound pressure comprising a sound may be contained within enclosure 200 and directed toward an opening of audio-transport tube 250 such that the sound may be reflected by audio reflector 260. In one embodiment, speakers 240 may be or include a speaker array comprised of a series of speakers coupled to crossover network 230. In another embodiment, speakers 240 may be or include a singular speaker. In other embodiments, speakers 240 may be or include a series of balanced armature drivers formed into an array, a singular balanced armature driver, a series of dynamic drivers formed into an array, a singular dynamic driver, and/or any combination of transducers suitable for converting electrical audio signals into sound waves.

In one embodiment, audio-transport tube 250 may comprise a system, device, or apparatus generally operable to transport sounds to audio reflector 260 from speakers 240. Specifically, audio-transport tube 250 may couple speakers 240 to audio reflector 260 such that audio reflector 260 may receive the sounds generated by speakers 240 and reflect the sounds throughout capture space 110. In one embodiment, audio-transport tube 250 may include one or more bends such that each bend modifies an overall frequency response of audio-transport tube 250. In one embodiment, audio-transport tube 250 may be comprised of a flexible material (e.g., plastic, carbon fiber, rubber, and the like) having elastic properties such that the formation of one or more bends in audio-transport tube 250 may vary depending on an orientation and/or movement of subject 160. Here, the overall frequency response of audio-transport tube 250 may be variable in that the flexible material allows audio-transport tube 250 to bend and contort into various shapes. In another embodiment, audio-transport tube 250 may be comprised of a rigid material (e.g., hardened steel, tungsten carbide, glass, and the like) having stiff properties such that the number of bends in audio-transport tube 250 may remain constant despite an orientation and/or movement of subject 160. Here, the overall frequency response of audio-transport tube 250 may be constant in that the rigid material prevents audio-transport tube 250 from bending, or otherwise contorting, after manufacturing. In other embodiments, audio-transport tube 250 may be comprised of any combination of flexible material and rigid material suitable for transporting sounds to audio reflector 260 from speakers 240. Audio-transport tube 250 is described further with respect to FIGS. 3A and 3B.

In one embodiment, audio reflector 260 may comprise a system, device, or apparatus generally operable to reflect sounds throughout capture space 110. In particular, audio reflector 260 may receive a sound from speakers 240 via audio-transport tube 250 and reflect the sound outwardly away from the head of subject 160. Upon reaching audio reflector 260 via audio-transport tube 250, the sound may reflect, or bounce, off audio reflector 260 inside an ear of subject 160. Audio reflector 260 may direct the reflected sound pressure outwardly away from the ear of subject 160, thus reflecting the sound throughout capture space 110. In one embodiment, audio reflector 260 may be removably coupled to an absorptive material (e.g., foam) preventing sound pressure from entering the inner-ear of a subject that may damage the eardrum and/or generate unwanted inner-ear frequency response. In one embodiment, audio reflector 260 may be configured to diffuse sounds throughout capture space 110. For example, audio reflector 260 may receive a sound from speakers 240 and diffuse the sound outwardly away from the head of subject 160. Audio reflector 260 is described further with respect to FIGS. 3A, 3B, 6A, and 6B.

In one embodiment, microphone 150 may comprise a system, device, or apparatus generally operable to capture sound (e.g., sound pressure waves) emitted by in-ear speaker 140. Specifically, microphone 150 may be coupled to audio reflector 260 such that microphone 150 may capture sounds within the ear of a subject before the sounds exit the ear and become modified by anthropometric features of the subject. Because the sounds are captured prior to becoming modified, sounds captured by microphone 150 may serve as reference signals in determining a dynamic HRTF for a subject as described above with respect to FIG. 1. In addition, the reference signal captured by microphone 150 may be used to account for the overall frequency response of audio-transport tube 250 caused by the one or more bends and to remove delay associated sounds captured by audio sensors 120. In one embodiment, microphone 150 may be or include a microelectromechanical system (MEMS) microphone. In other embodiments, microphone 150 may be or include a dynamic microphone, a condenser microphone, a piezoelectric microphone, or any combination of transducers suitable for receiving and converting sound waves into electrical signals.

Figure 3A:
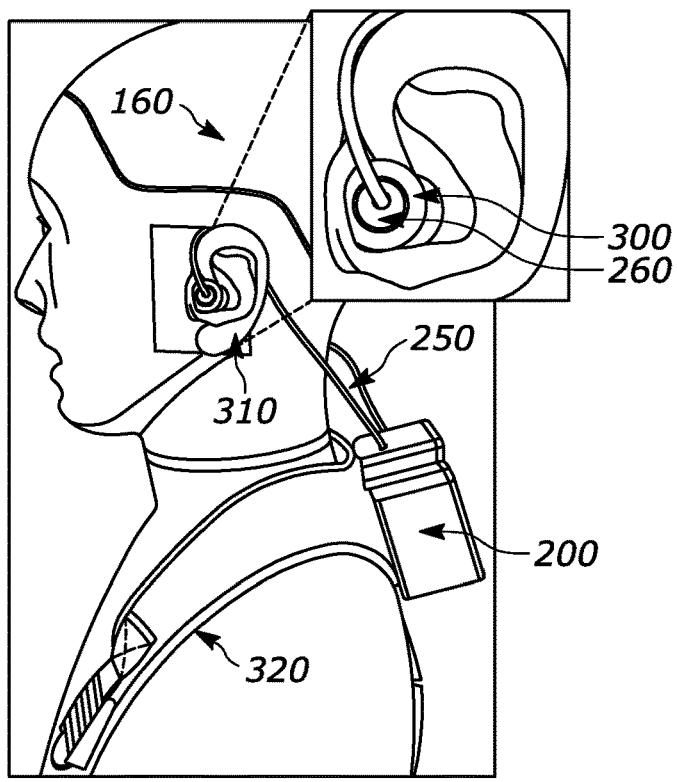
FIGS. 3A and 3B illustrate selected elements of an example in-ear speaker being worn by a subject.
Figure 3B:
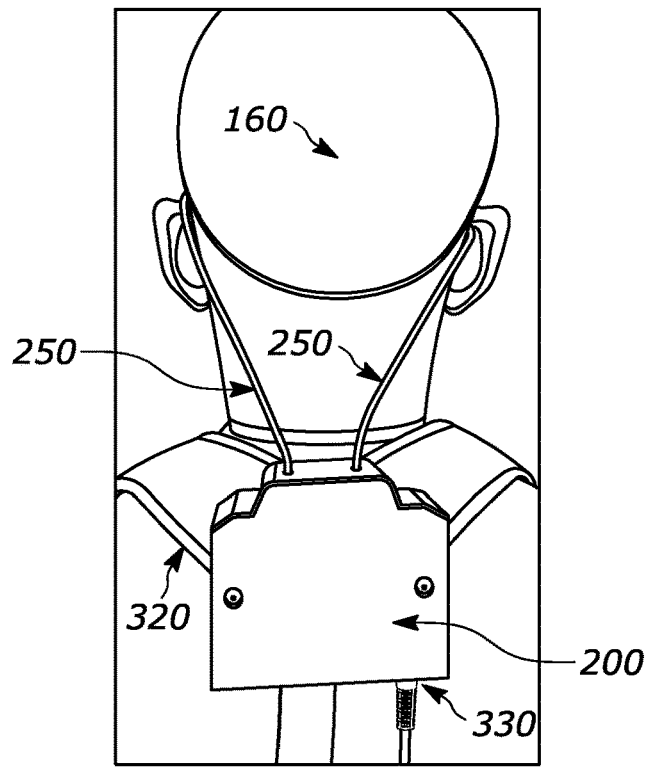

FIGS. 3A and 3B illustrate selected elements of an example in-ear speaker being worn by a subject. In the example illustrated in FIGS. 3A and 3B, in-ear speaker 140 may include audio reflector 260, absorptive material 300, audio-transport tubes 250, and enclosure 200. Enclosure 200 may be coupled to shoulder harness 320 and may include crossover network 230 and speakers 240 enclosed within (not shown in figures). In other embodiments, in-ear speaker 140 may include additional, fewer, and/or any combination of components suitable for emitting a sound outwardly away from the head of subject 160.

FIG. 3A illustrates a side view of in-ear speaker 140 being worn by subject 160. In the example illustrated in FIG. 3A, enclosure 200 may be coupled to shoulder harness 320 worn by subject 160 proximate to the base of the neck. Audio-transport tubes 250 may be coupled to enclosure 200. Specifically, audio-transport tubes 250 may be coupled to speakers 240 enclosed within enclosure 200 to receive a sound emitted by speakers 240. Audio-transport tubes 250 may direct the sound received from speakers 240 from enclosure 200 to audio reflector 260. In the embodiment illustrated in FIGS. 3A and 3B, audio-transport tubes 250 may loop behind an ear 310 of subject 160 to direct the sound to audio reflector 260. Upon reaching audio reflector 260 via audio-transport tube 250, the sound pressure comprising the sound may reflect, or bounce, off audio reflector 260 inside the ear 310 of subject 160, thus directing the sound pressure outwardly away from the ear 310.

In the example illustrated in FIG. 3A, audio reflector 260 may be removably coupled to absorptive material 300 inside the ear 310 of subject 160. Specifically, absorptive material 300 may include an outward-facing end having a concave, or cupped, center contoured to receive a peg (not shown in figure) of audio reflector 260. Additionally, absorptive material 300 may include an inward-facing end contoured to be worn inside an inner-ear of subject 160. The inward-facing end of absorptive material 300 may prevent the inner-ear of subject 160 from receiving the sound reflected by audio reflector 260. In particular, the inward-facing end of absorptive material 300 may prevent sound pressure from entering the inner-ear of subject 160 that may damage the eardrum, thus ensuring the safety of subject 160 while in-ear speaker 140 emits a sound.

FIG. 3B illustrates a rear view of in-ear speaker 140 being worn by subject 160. In the example illustrated in FIG. 3B, enclosure 200 may be coupled to shoulder harness 320 between the shoulders of subject 160 proximate to the base of the neck. Enclosure 200 may include headphone jack 330, or similar multi-channel audio coupler, used to receive a source audio signal from audio converter 220 (shown in FIG. 2). Specifically, crossover network 230 (shown in FIG. 2) enclosed within enclosure 200 may receive the analog source audio signal from audio converter 220 and split the source audio signal into two or more respective frequencies such that each respective frequency may be emitted by a speaker within speakers 240 (shown in FIG. 2). Speakers 240 may be enclosed within enclosure 200 such that sounds emitted from speakers 240 are prevented from diffusing throughout the surrounding capture space 110. That is, sound pressure may be contained within enclosure 200 and directed toward openings of audio-transport tubes 250 such that the sound may be reflected by audio reflector 260.

Figure 4:
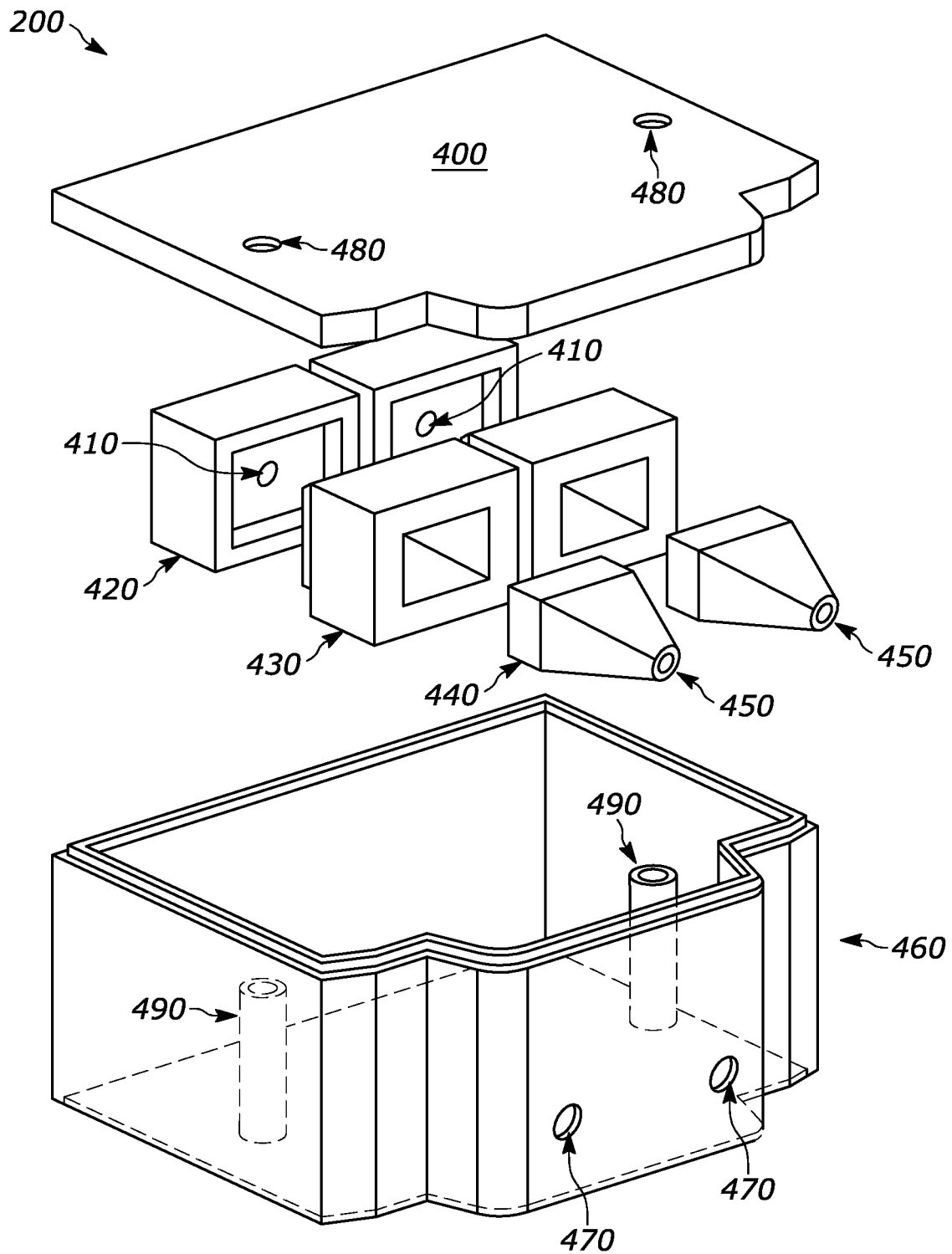
FIG. 4 illustrates selected elements of an example enclosure of an in-ear speaker.

FIG. 4 illustrates selected elements of an example enclosure of an in-ear speaker. In the example illustrated in FIG. 4, enclosure 200 includes enclosure top portion 400, speaker housing caps 420 (individually referred to herein as "speaker housing cap 420"), speaker housing sections 430 (individually referred to herein as "speaker housing section 430"), speaker funnels 440 (individually referred to herein as "speaker funnel 440"), and enclosure bottom portion 460. Speaker housing caps 420 may include speaker housing cap holes 410 (individually referred to herein as "speaker housing cap hole 410"). Speaker funnels 440 may include speaker funnel outputs 450 (individually referred to herein as "speaker funnel output 450"). Enclosure top portion 400 may include screw holes 480. Enclosure bottom portion 460 may include speaker funnel output holes 470 (individually referred to herein as "speaker funnel output hole 470") and screw holes 490. It is noted that although crossover network 230 and speakers 240 are not illustrated in FIG. 4, enclosure 200 may enclose crossover network 230 and speakers 240 as described with respect to FIGS. 2 and 3 above. In other embodiments, enclosure 200 may include additional, fewer, and/or any combination of components suitable for preventing sounds from diffusing throughout the surrounding capture space 110.

In one embodiment, enclosure top portion 400 may be removably coupled to enclosure bottom portion 460 to enclose speaker housing caps 420, speaker housing sections 430, and speaker funnels 440 within enclosure 200. In particular, enclosure top portion 400 may be removably coupled to enclosure bottom portion 460 by coupling screw holes 480 of enclosure top portion 400 to screw holes 490 of enclosure bottom portion 460 using screws (not shown in figure). In one embodiment, enclosure top portion 400 and enclosure bottom portion 460 may be comprised of a rigid material (e.g., opaque thermoplastic, amorphous polymer, and the like) that provides impact resistance, strength, and heat resistance. For example, enclosure top portion 400 and enclosure bottom portion 460 may each be comprised of acrylonitrile butadiene styrene (ABS) plastic that may be 3D printed to form enclosure top portion 400 and enclosure bottom portion 460. In one embodiment, enclosure top portion 400, speaker housing caps 420, speaker housing sections 430, speaker funnels 440, and enclosure bottom portion 460 may be comprised of the same material. In other embodiments, enclosure top portion 400, speaker housing caps 420, speaker housing sections 430, speaker funnels 440, and enclosure bottom portion 460 may be comprised of two or more materials.

In one embodiment, speaker housing caps 420, speaker housing sections 430, and speaker funnels 440 may be removably coupled together within enclosure 200. Specifically, speaker housing caps 420 may be removably coupled to speaker housing sections 430 and speaker housing sections 430 may be removably coupled to speaker funnels 440. In the embodiment illustrated in FIG. 4, each speaker funnel 440 may include one or more speakers 240. Speaker housing cap holes 410 of speaker housing caps 420 may allow crossover network 230 (not shown in figure) enclosed in enclosure 200 to provide frequency signals (e.g., high-frequency, middle-frequency, and low-frequency signals) to each speaker of speakers 240 (not shown in figure) enclosed in speaker funnels 440. For example, one or more wires carrying respective frequency signals may be threaded through speaker housing cap hole 410 of speaker housing cap 420 and coupled to respective speakers of speakers 240 housed within speaker funnel 440. Each speaker funnel 440 may include one or more speakers 240 such that in-ear speaker 140 may output a high signal-to-noise ratio (SNR) to aid in processing the audio recordings of sounds captured by audio sensors 120 as described with respect to FIG. 1. For example, speaker funnel 440 may house one or more speakers 240 that include four tweeter speakers and two woofer speakers that each emit respective frequencies to generate a sound. Sounds emitted by each speaker of speakers 240 may exit speaker funnels 440 at speaker funnel outputs 450 and enter respective openings of audio-transport tubes 250 via speaker funnel output holes 470. Removably coupling speaker housing caps 420, speaker housing sections 430, and speaker funnels 440 together may prevent sounds emitted by speakers 240 from diffusing throughout enclosure 200 and, in turn, from diffusing throughout the surrounding capture space 110. Speaker funnel 440 is described in further detail with respect to FIG. 5.

Figure 5:
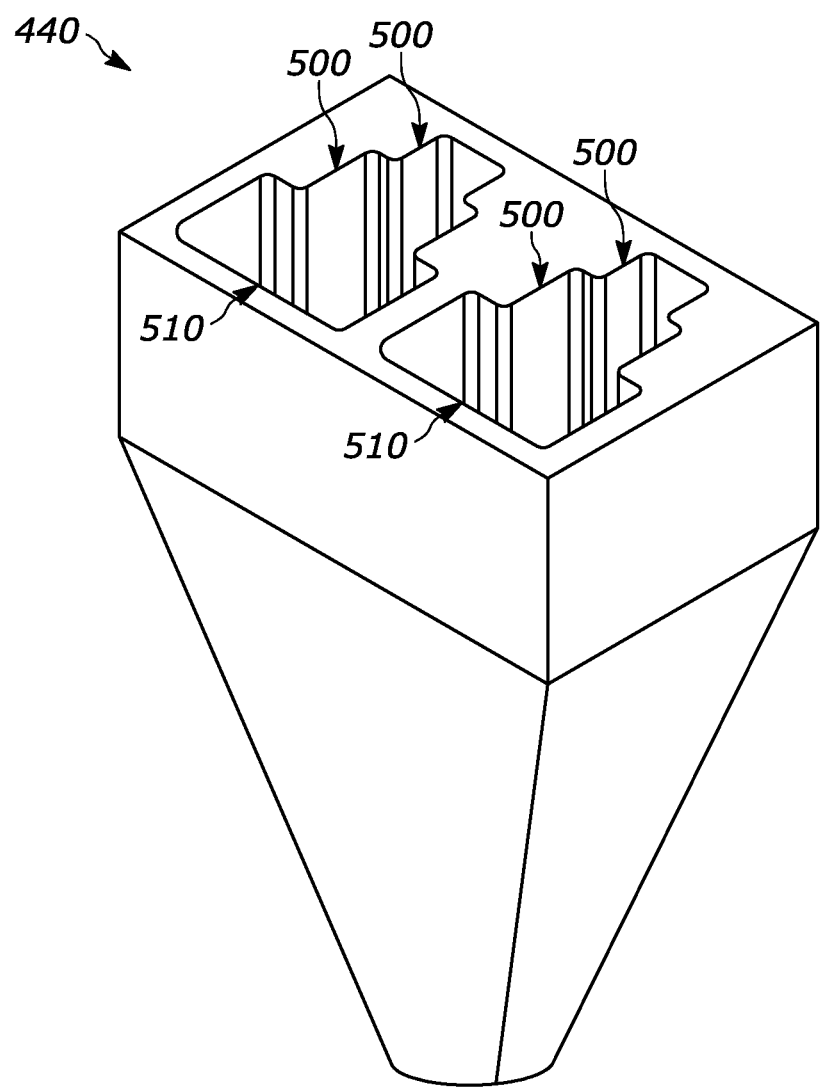
FIG. 5 illustrates selected elements of an example speaker funnel of an enclosure.

FIG. 5 illustrates selected elements of an example speaker funnel of an enclosure. In one embodiment, speaker funnel 440 may comprise a system, device, or apparatus generally operable to house speakers 240 within enclosure 200. In particular, speaker funnel 440 may include one or more slots that are each contoured to house a speaker of speakers 240. In the example illustrated in FIG. 5, speaker funnel 440 may include two sets of tweeter slots 500 (individually referred to herein as "tweeter slot 500") and two woofer slots 510 (individually referred to herein as "woofer slot 510"). In one embodiment, speaker funnel 440 may include two of each slot in order to increase sound pressure level, measured in decibels, output from each speaker funnel 440 without causing destructive interference amongst sound waves comprising each sound. Increasing the sound pressure level output from each speaker funnel 440 may increase SNR which aids in processing the audio recordings of sounds captured by audio sensors 120 as described with respect to FIG. 1. In other embodiments, speaker funnel 440 may include additional, fewer, and/or any combination of slots suitable for housing speakers 240.

In one embodiment, each tweeter slot 500 may be contoured to house a speaker that is optimized to emit high-frequency to middle-frequency signals received from crossover network 230. In the embodiment illustrated in FIG. 5, speaker funnel 440 may include two differently-sized tweeter slots 500. Specifically, the smaller tweeter slots 500 shown in FIG. 5 may be contoured to house speakers optimized to emit high-frequencies while the larger tweeter slots 500 may be contoured to house speakers optimized to emit middle to low-frequencies. In one embodiment, each tweeter slot 500 may house a balanced armature driver optimized to emit a high-frequency to middle-frequency signal. In another embodiment, each tweeter slot 500 may house a dynamic driver optimized to emit a high-frequency to middle-frequency signal. In the embodiment illustrated in FIG. 5, each speaker funnel 440 of enclosure 200 may include a total of four tweeter slots 500. In other embodiments, each speaker funnel 440 of enclosure 200 may include additional, fewer, or any number of tweeter slots 500 suitable for emitting high-frequency to middle-frequency signals and increasing SNR.

In one embodiment, each woofer slot 510 may be contoured to house a speaker that is optimized to emit low-frequency signals received from crossover network 230. In the embodiment illustrated in FIG. 5, speaker funnel 440 may include two woofer slots 510. In one embodiment, each woofer slot 510 may house a balanced armature driver optimized to emit a low-frequency signal. In another embodiment, each woofer slot 510 may house a dynamic driver optimized to emit a low-frequency signal. In the embodiment illustrated in FIG. 5, each speaker funnel 440 of enclosure 200 may include a total of two woofer slots 510. In other embodiments, each speaker funnel 440 may include additional, fewer, or any number of woofer slots 510 suitable for emitting low-frequency signals and increasing SNR.

Figure 6B:
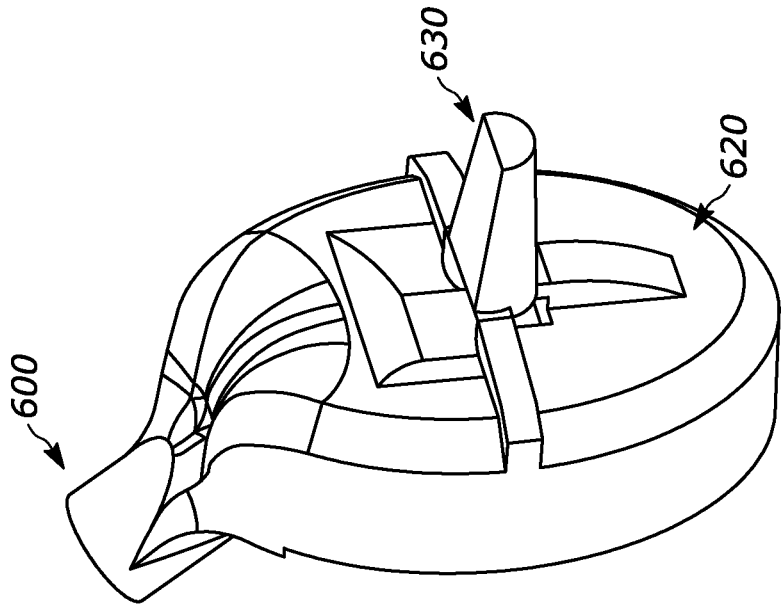
FIGS. 6A and 6B illustrate selected elements of an example audio reflector of an in-ear speaker.
Figure 6A:
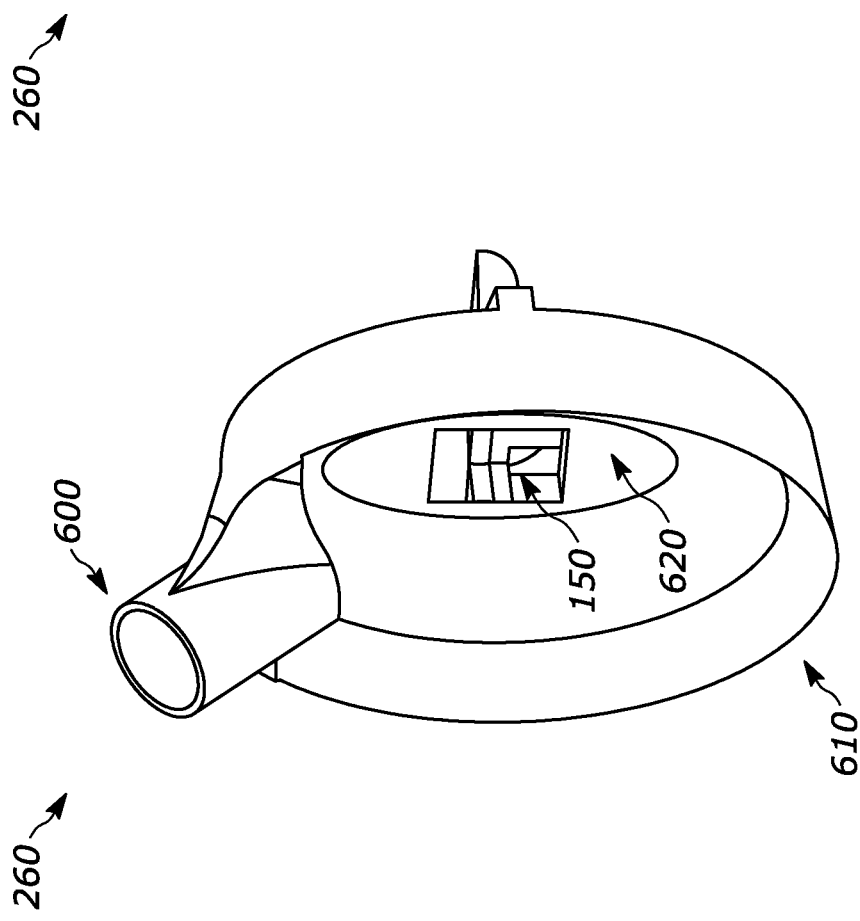

FIGS. 6A and 6B illustrate selected elements of an example audio reflector of an in-ear speaker. As described above with respect to FIG. 2, audio reflector 260 may comprise a system, device, or apparatus generally operable to reflect sounds throughout capture space 110 (shown in FIG. 1). Specifically, audio reflector 260 may receive a sound from speakers 240 (shown in FIG. 2) via audio-transport tube 250 (shown in FIG. 2) and reflect the sound outwardly away from the head of subject 160 (shown in FIG. 1). In the example illustrated in FIGS. 6A and 6B, audio reflector 260 may have a slightly elliptical shape contoured to be worn inside the ear of a subject and may include audio reflector opening 600, microphone 150, an open end 610, a closed end 620, and a peg 630. In one embodiment, audio reflector 260 may be coupled to audio-transport tube 250 via audio reflector opening 600. In other embodiments, audio reflector 260 may include additional, fewer, and/or any combination of components suitable for reflecting sounds throughout capture space 110.

FIG. 6A illustrates a front three-quarter view of audio reflector 260. In the example illustrated in FIG. 6A, audio reflector 260 may be contoured into a truncated cone shape having an open end 610 and a closed end 620. The open end 610 may be directed away from the ear of a subject. The closed end 620 may be or include a rigid surface worn inside the ear of a subject and configured to reflect, or diffuse, a sound away from the ear of the subject through open end 610. Specifically, audio reflector 260 may receive a sound from audio-transport tube 250 via audio reflector opening 600. As shown in FIGS. 3A and 3B, audio-transport tube 250 may be looped behind an ear 310 of subject 160. Therefore, audio reflector opening 600 may be oriented such that audio-transport tube 250 may couple with audio reflector opening 600 proximate to the upper portion of an ear of a subject. In addition, audio reflector 260 may be oriented such that sound received from audio-transport tube 250 may be directed toward microphone 150 located on the rigid surface of closed end 620. That is, the sound pressure comprising a sound may reflect, or bounce, off closed end 620 of audio reflector 260 inside the ear of a subject. Audio reflector 260 may direct the reflected sound pressure outwardly away from the ear of the subject, thus reflecting the sound throughout capture space 110. In addition, the microphone 150 may capture the sounds within the ear of the subject before the sounds exit the ear and become modified by anthropometric features of the subject.

FIG. 6B illustrates a rear three-quarter view of audio reflector 260. In the example illustrated in FIG. 6B, audio reflector 260 may include a peg 630 extending from the back side of closed end 620. In one embodiment, peg 630 may be removably coupled with absorptive material 300 (shown in FIG. 3A) inside an ear of a subject. In particular, peg 630 may be contoured to removably couple with an outward-facing end of absorptive material 300 having a concave, or cupped, center contoured to receive peg 630 as described with respect to FIG. 3A. Peg 630 may ensure that audio reflector 260 remains positioned within the ear of the subject while the inward-facing end of absorptive material 300 may prevent the inner-ear of subject 160 from receiving the sound reflected by audio reflector 260.

Figure 7:
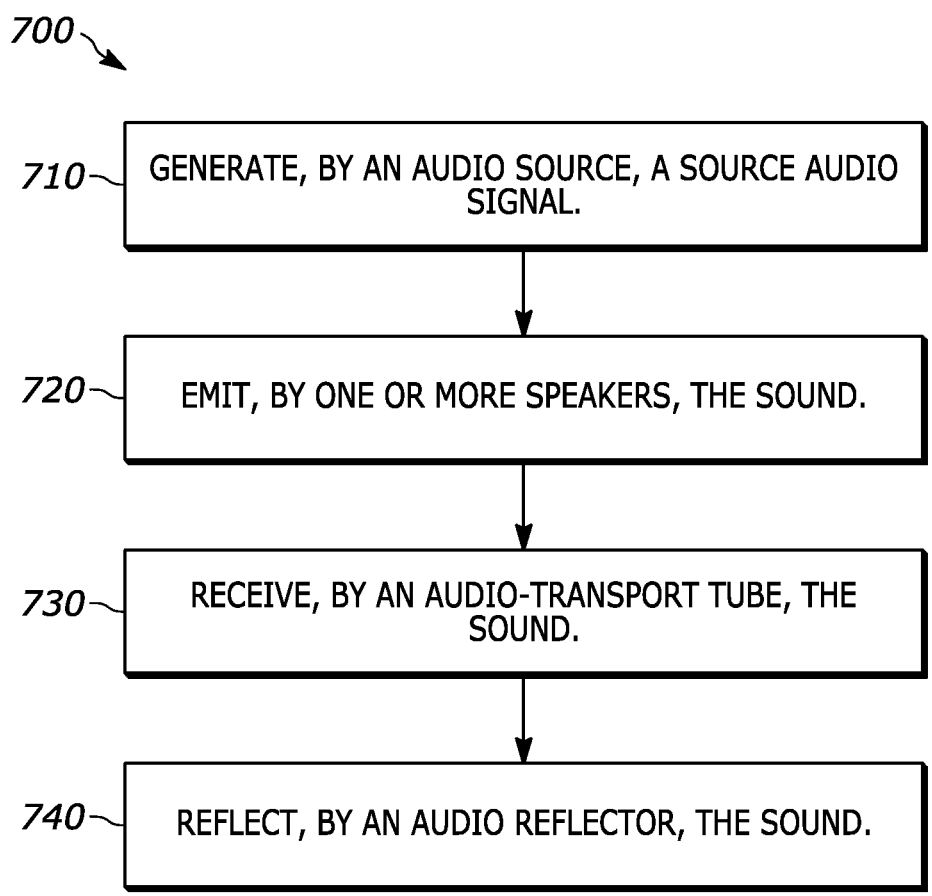
FIG. 7 illustrates selected elements of an example method for emitting a sound from an in-ear speaker worn by a subject.

FIG. 7 illustrates selected elements of an example method for emitting a sound from an in-ear speaker worn by a subject. The method may begin at step 710, where an audio source of the in-ear speaker generates a source audio signal. At step 720, one or more speakers of the in-ear speaker may emit a sound based on the source audio signal. The one or more speakers may comprise a singular speaker and/or a speaker array coupled to a crossover network. At step 730, an audio-transport tube of the in-ear speaker may receive the sound. The audio-transport tube has an input end coupled to the one or more speakers to receive the sound. At step 740, an audio reflector of the in-ear speaker may reflect the sound, where the audio reflector is coupled to an output end of the audio-transport tube.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for emitting a sound from an in-ear speaker worn by a subject including the particular steps of the method of FIG. 7, this disclosure contemplates any suitable method for emitting a sound from an in-ear speaker worn by a subject including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
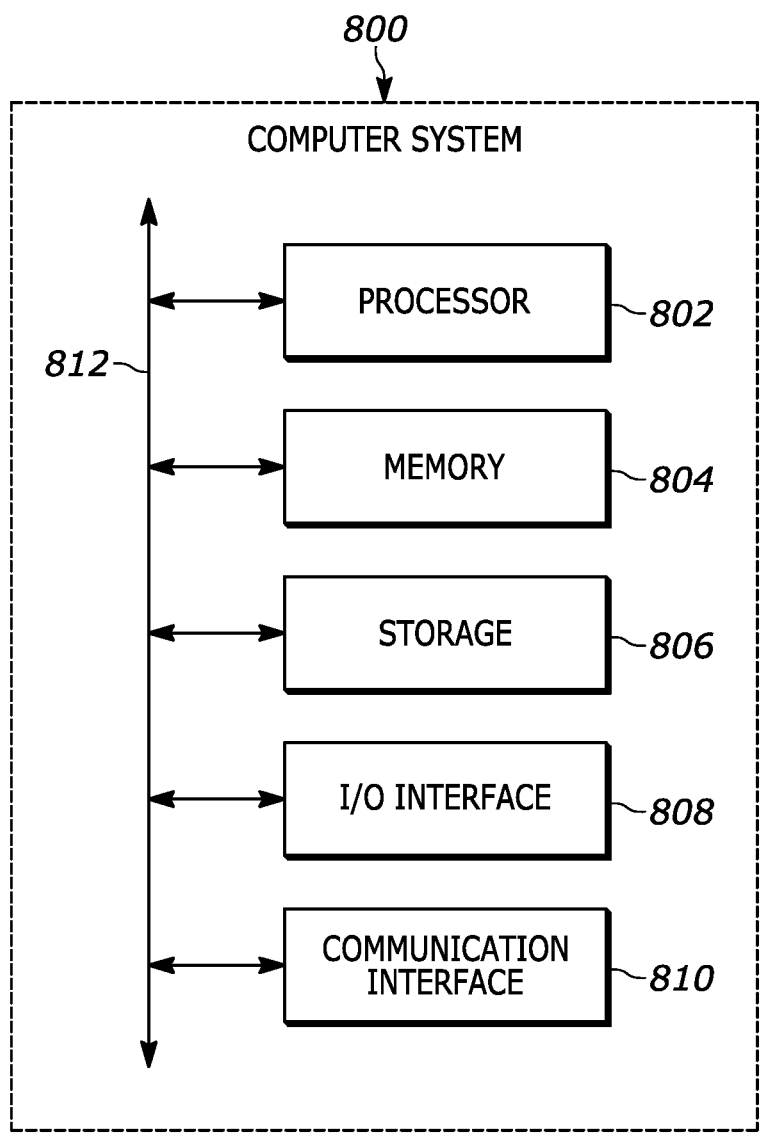
FIG. 8 illustrates selected elements of an example computer system.

FIG. 8 illustrates selected elements of an example computer system. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An in-ear speaker configured to be worn by a subject, the in-ear speaker comprising:
an audio source configured to generate a source audio signal;
one or more speakers configured to emit a sound based on the source audio signal;
an enclosure configured to enclose the one or more speakers;
an audio-transport tube having an input end coupled to the enclosure to receive the sound from the enclosure; and
an audio reflector coupled to an output end of the audio-transport tube and configured to reflect the sound, wherein the audio reflector further comprises a microphone coupled to the audio reflector and configured to capture the sound.

2. The in-ear speaker of claim 1, wherein the microphone is enclosed within the audio reflector.

3. The in-ear speaker of claim 1, wherein the audio reflector is configured to be worn inside an ear of the subject.

4. The in-ear speaker of claim 3, wherein the audio reflector includes an open end and a closed end, the open end directed away from the ear of the subject, the closed end comprised of a rigid surface worn inside the ear of the subject and configured to reflect the sound away from the ear of the subject through the open end.

5. The in-ear speaker of claim 1, wherein the audio reflector is removably coupled to an absorptive material configured to be worn inside an inner-ear of the subject to prevent the inner-ear from receiving the sound.

6. The in-ear speaker of claim 1, wherein the audio source further comprises:
an audio converter coupled to the audio source and configured to convert a digital source audio signal into the source audio signal.

7. The in-ear speaker of claim 1, wherein each of the one or more speakers is disposed within a speaker funnel inside the enclosure.

8. The in-ear speaker of claim 1, wherein the one or more speakers comprise a singular speaker.

9. The in-ear speaker of claim 1, wherein the one or more speakers comprise a speaker array coupled to a crossover network, the crossover network coupled to the audio source and configured to filter the source audio signal from the audio source into a plurality of frequency signals, the speaker array comprised of a plurality of speakers configured to respectively emit a frequency signal of the plurality of frequency signals.

10. A method for emitting a sound from an in-ear speaker worn by a subject, the method comprising:
   generating, by an audio source of the in-ear speaker, a source audio signal;
   emitting, by one or more speakers of the in-ear speaker, the sound based on the source audio signal;
   receiving, by an audio-transport tube of the in-ear speaker, the sound, the audio-transport tube having an input end coupled to the one or more speakers to receive the sound;
   reflecting, by an audio reflector of the in-ear speaker, the sound, the audio reflector coupled to an output end of the audio-transport tube; and
   capturing, by a microphone of the in-ear speaker, the sound, the microphone coupled to the audio reflector.

11. The method of claim 10, wherein the microphone is enclosed within the audio reflector.

12. The method of claim 10, wherein the audio reflector is configured to be worn inside an ear of the subject.

13. The method of claim 12, wherein the audio reflector includes an open end and a closed end, the open end directed away from the ear of the subject, the closed end comprised of a rigid surface worn inside the ear of the subject and configured to reflect the sound away from the ear of the subject through the open end.

14. The method of claim 10, further comprising:
   preventing, by an absorptive material removably coupled to the audio reflector, an inner-ear of the subject from receiving the sound, the absorptive material configured to be worn inside the inner-ear of the subject.

15. The method of claim 10, further comprising:
   converting, by an audio converter coupled to the audio source, a digital source audio signal into the source audio signal.

16. The method of claim 10, wherein each of the one or more speakers is disposed within a speaker funnel inside the enclosure.

17. The method of claim 10, wherein the one or more speakers comprise a singular speaker.

18. The method of claim 10, wherein the one or more speakers comprise a speaker array coupled to a crossover network, the crossover network coupled to the audio source and configured to filter the source audio signal from the audio source into a plurality of frequency signals, the speaker array comprised of a plurality of speakers configured to respectively emit a frequency signal of the plurality of frequency signals.

* * * * *